Jan. 8, 1935.    H. G. FRENCH    1,987,438
SEARCHLIGHT ELEVATING MECHANISM
Filed June 23, 1933

Inventor:
Henry G. French,
by Harry E. Dunham
His Attorney.

Patented Jan. 8, 1935

1,987,438

UNITED STATES PATENT OFFICE 1,987,438

SEARCHLIGHT ELEVATING MECHANISM

Henry G. French, Schenectady, N. Y., assignor to General Electric Company, a corporation of New York Application June 23, 1933, Serial No. 677,208

6 Claims. (Cl. 240—61.1)

My invention relates to a mechanical control device for searchlights, and more particularly to an improved elevating mechanism for controlling the movement in a vertical plane of a searchlight which is mounted on a pedestal rotatable in a horizontal plane.

The principal object of my invention is to provide an improved elevating mechanism which will be unaffected by the rotation of the pedestal and which will adjust the elevation of the searchlight without tending to rotate the pedestal and thereby change the position of the searchlight in the horizontal plane.

For a consideration of what I believe to be novel and my invention, attention is directed to the following specification and claims appended thereto.

Figure 1:
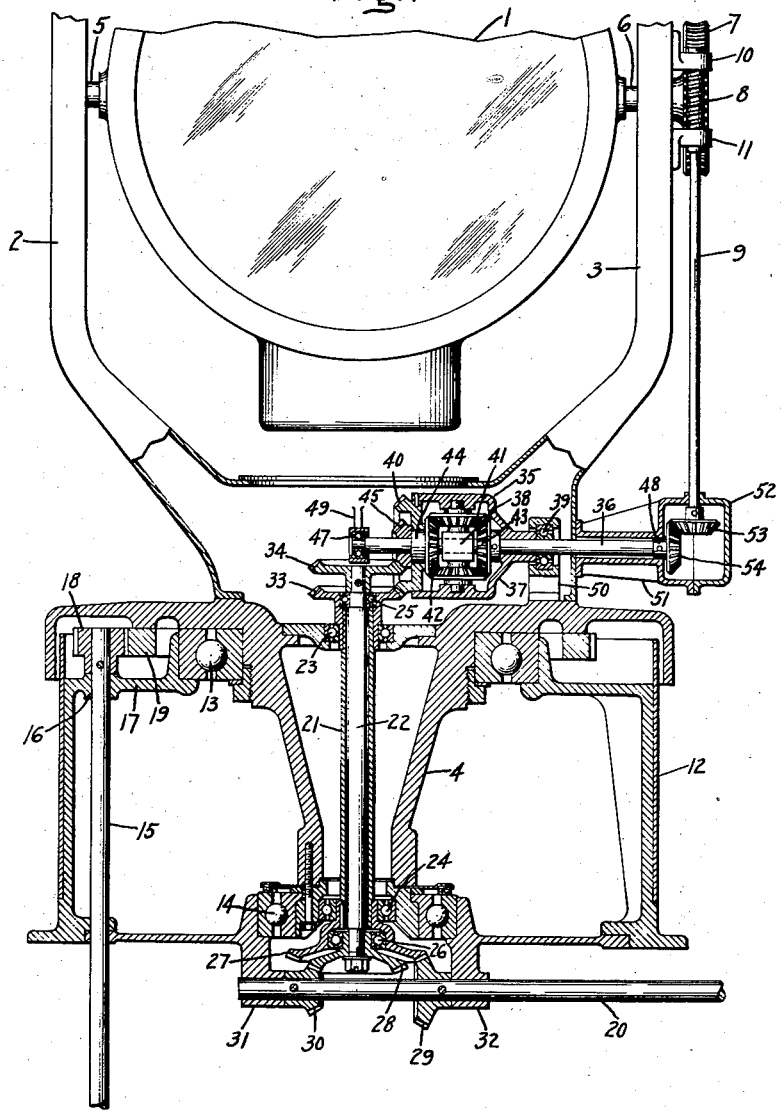
Figure 2:
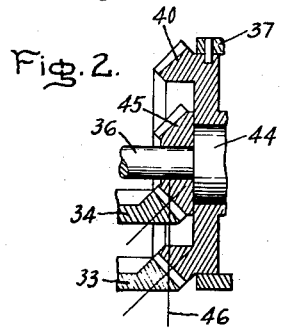

Fig. 1 of the drawing illustrates a front elevation, partially in section, of a searchlight provided with an elevating mechanism built in accordance with my invention, and Fig. 2 is an enlarged view of a portion of the elevating mechanism.

Fig. 1 of the drawing illustrates a searchlight casing 1 pivotally mounted on the arms 2 and 3 of a pedestal 4 by means of trunnions 5 and 6. The searchlight may be adjusted for elevation in a vertical plane by a worm gear 7 attached to the trunnion 6 and by a worm 8. The worm 8 is mounted on a shaft 9 between brackets 10 and 11. The brackets are attached to the arm 3 of the pedestal and the shaft 9 is rotatable in bearings mounted in the brackets.

The pedestal 4 is rotatably mounted on a stationary base 12, being mounted on roller bearings 13 and 14. The pedestal may be rotated by a shaft 15 mounted in a bearing 16 located in a web 17 which is integral with the base 12. The shaft 15 is provided with a pinion gear 18 which is arranged to mesh with a ring gear 19 attached to the pedestal 4. Any rotation of the shaft 15 therefore causes a movement of the searchlight in a horizontal plane, which movement is referred to for convenience as the traverse.

The movement of the searchlight in a vertical plane, commonly referred to as the elevation, is controlled by the shaft 9, which in turn is operated by a drive shaft 20 mounted on the base 12, through a control mechanism built in accordance with my invention. The shaft 9 being mounted on the pedestal 4 moves therewith and thereby changes its location with respect to shaft 20. This movement results in a rotation of the shaft 9 about its own axis if ordinary gearing is used. On the other hand, if it is desired to elevate the searchlight, a force is exerted by such mechanism tending to rotate the pedestal. In accordance with my invention I provide an elevating mechanism including a differential gear mechanism mounted on the rotating pedestal 4 and geared between the shafts 9 and 20 in such manner that it is independent of or unaffected by the rotation of the pedestal 4 and in turn exerts no rotating force upon the pedestal.

This mechanism comprises two concentric vertical shafts 21 and 22 mounted coaxially with the vertical axis of rotation of the pedestal 4. Shaft 21 is mounted for rotation in bearings 23 and 24 and shaft 22 is mounted for rotation in bearings 25 and 26. Shaft 21 is provided with a bevel gear 27 and shaft 22 is provided with a similar gear 28 which gears are arranged to mesh with gears 29 and 30 attached to the shaft 20. This shaft is mounted for rotation in bearing brackets 31 and 32 secured to the stationary base 12. The ratios of transmission of the gears 27-29 and 28-30 are equal to each other so that the rotation of the two vertical shafts in opposite directions from any fixed point is exactly the same. The shafts 21 and 22 are further provided, at their respective upper ends, with bevel gears 33 and 34, which two gears are of equal diameter and equal number of teeth. The movement of these gears is transmitted to a differential mechanism 35, which in turn is geared to a shaft 36. This part of the elevating mechanism may be referred to for convenience as the base part of the mechanism since it is attached to the base and is therefore stationary.

The differential mechanism comprises a housing 37 to which the pinion spider 38 is attached. The housing is mounted for rotation about the shaft 36 in bearing 39, located at one end of the housing and is rotated by a gear 40 meshing with gear 33 mounted at the other end of the housing. The spider 38 is free to rotate about the shaft 36 and carries pinions 41 on its respective arms. The number of the pinions 41 is immaterial. In the present case two are used being meshed with planetary gears 42 and 43. The pinions 41 and the planetary gears 42 and 43 used in the present apparatus are of exactly the same diameter and have the same number of teeth, although the pinions 41 may be of any convenient size with respect to the planetary gears. The gear 43 is attached to the horizontal shaft 36 and the gear 42 is attached to a collar 44 which is rotatable about the shaft 36 and whose outer surface provides a bearing surface for the gear 40. This arrangement provides a support for the gear-end of the housing 37. A gear 45, meshing with gear 34, is attached to the other end of the collar 44. This gear 45 is mounted for rotation within the gear 40 and is provided with only one-half as many teeth as the gear 40 so that it makes two revolutions for every one of the gear 40. Furthermore, the gears 33 and 34 on the vertical shafts being of exactly the same size, the gears 40 and 45 for driving the differential meshing therewith are mounted in the same plane so that the centers of pressure for the two pairs of gears are vertically in line with each other. This is clearly indicated in Fig. 2 wherein the vertical line 46 intersects the center lines of the two pairs of gear faces.

The horizontal shaft 36 is mounted for rotation in bearings 47 and 48. Bearing 47 is attached to a bracket 49 secured within the pedestal and is mounted so that the axis of the pedestal intersects the center line of the shaft 36. With this mounting, the gears 40 and 45 will always be in line with the gears 33 and 34 and will be held in mesh by the bearing 39 mounted in a bracket 50 which is also secured to the pedestal. The horizontal shaft bearing 48 is mounted in a bracket 51 which is provided with a housing 52 surrounding a pair of bevel gears 53 and 54 attached respectively to the shafts 9 and 36. The shafts 36 and 9, together with the interconnecting gearing for driving the casing 1, may be referred to as the pedestal part of the mechanism, this part of the mechanism being mounted directly on the pedestal and therefore movable therewith relative to the base part of the mechanism. The connection between the two parts of the elevating mechanism is completed by the differential which transmits the force of the drive shaft to the casing in such manner that there will be no tendency to rotate the pedestal and on the other hand when the pedestal is rotated will continually change the position of the pedestal part of the mechanism relatively to the base part so that no movement of the casing will result due to the rotation of the pedestal.

In operation the shaft 15 is operated, either by a motor or hand-wheel, to rotate the searchlight in a horizontal plane. When the pedestal 4 is so rotated the driving gears 40 and 45 for the differential will roll along in the same direction on the gears 33 and 34. There can be no movement between the gears 33 and 34 since these gears and their respective shafts are interlocked by the two pinions 29 and 30, which are both rigidly secured to the shaft 20 and are connected to the shafts 21 and 22 by gears 27 and 28, respectively. The gear 45 being one-half the size of the gear 40 will rotate the planetary gear 42 twice as fast as the gear 40 will rotate the casing 37 and the spider 38. Both the pinions 41 and the planetary gear 42 are thereby rotated about shaft 36 and if the shaft 36 is to be maintained in a fixed position, a certain relative motion between the casing gear 40 and the driving gear 45 for the planetary gear 42 must take place. With the planetary gears 42 and 43 interconnected with each other through the pinions 41, it will be clear that the rotation of the gear 45 will be necessarily the accumulative action of the rotation of the spider 38 about the shaft 36 and the rotation of the pinions 41 about the spider arms. This fact will be apparent if the spider 38 is considered stationary and the two planetary gears 42 and 43 moved. Under these conditions the movement of one will be transmitted by the pinions to the other in an opposite direction. The total movement of each with respect to the spider will also be equal since each gear moves the same number of teeth. If then it is considered that gear 43 remains stationary, the spider 38 and the gear 42 will necessarily move and since the spider 38 will again be halfway between the stationary point on the gear 43 and the corresponding starting point on the gear 42, it will have rotated one-half the distance that the gear 42 has rotated. The rotation of gear 45 is, therefore, twice that of gear 40. This is exactly the ratio that is established between these two gears, as has been above explained, and therefore the shaft 36 remains stationary with respect to the pedestal irrespective of the rotation of the pedestal with respect to the base.

When it is desired to adjust the elevation of the searchlight, it is necessary to turn shaft 20 either by hand or a motor. It has been pointed out above that the transmission ratios of the gears 27—29 and 28—30 are equal. It has also been pointed out that the application of the torque from gears 33 and 34 to the gears 40 and 45 are directly above each other and therefore at equal distances from the axis of rotation of the pedestal. Furthermore, although the gear ratios of the gears 33—40 and 34—45 are 2 to 1, the actual force applied, which is the product of torque and radius, are also equal since gear 40 is necessarily twice the radius of gear 45. This arrangement therefore divides the forces applied to the horizontal shaft 36 for elevation adjustments, which tend to rotate the pedestal, into two opposite horizontal components and balances them against each other through the differential mechanism. The elevation adjustments are thereby made without exerting a turning force upon the pedestal and affecting its position with respect to the base.

The transmission of the driving force of the gears 33 and 34 to the gears 40 and 45, respectively, at equal distances from the vertical axis of rotation, as shown in Fig. 2, insures a complete balancing of the horizontal components of the forces. If, however, it is desired to exert a rotational force upon the pedestal simultaneously with the adjustment of the elevation, it is only necessary to locate the two points of transmission at different distances from the axis. In that case, the moments of the two horizontal forces are unequal and therefore cannot be balanced by the differential since the ratio of the gears must be maintained two to one, as above explained. The elevation adjustment will not be changed in this latter case by the rotation of the pedestal, but a rotating force proportionate to the displacement of the two points with respect to each other is obtained when adjusting the elevation.

I have hereby provided an improved mechanical means for adjusting an object in either of two planes without affecting the adjustment in the other plane. It will be clear that although I have used a searchlight to illustrate my invention, the same mechanism can be applied to the adjustment of guns or any other object for which such adjustments are necessary.

What I claim as new and desire to secure by Letters Patent of the United States is:

1. In a searchlight including a base, a pedestal mounted thereon for rotation about a vertical axis and a searchlight casing mounted on said pedestal for elevation in a vertical plane, the combination of an elevating mechanism including a drive shaft mounted on said base, a pair of concentric shafts arranged coaxially with said pedestal and connected to said drive shaft for rotation in opposite directions, and a differential mechanism connected between said concentric shafts and said casing arranged to transmit the movement of said shafts to said casing as a single movement in the proper direction.

2. In a searchlight comprising a base, a pedestal mounted for rotation thereon, a searchlight casing mounted for elevation on said pedestal, the combination of a mechanism for controlling said elevation including a drive shaft mounted on said base, a pair of concentric shafts arranged coaxially with said pedestal and connected to said drive shaft for rotation in opposite directions, and a differential mechanism mounted on said pedestal connected to said concentric shafts and said searchlight casing for elevating said drum independently of the rotation of said pedestal.

3. In a searchlight comprising a base, a pedestal rotatable with respect to said base, and a searchlight casing movable in a vertical plane with respect to said pedestal, the combination of a mechanism for moving said casing independently of the movement of said pedestal including a drive shaft mounted on said base, a pair of concentric shafts mounted coaxially with said pedestal and connected to said drive shaft for rotation in opposite directions, a differential mechanism comprising a pair of planetary gears, one of said gears being connected to said casing, the other being connected to one of said concentric shafts, a plurality of pinions interconnecting said gears, and a spider for supporting said pinions connected to said second concentric shaft.

4. In a searchlight comprising a base, a pedestal mounted for rotation about a vertical axis on said base, a searchlight casing mounted on said pedestal for rotation about a horizontal axis, the combination of a drive shaft mounted on said base, a pair of concentric shafts connected to said drive shaft for movement in opposite directions and arranged coaxially with said pedestal, a differential mechanism connected to drive said casing and arranged to be driven by said concentric shafts, the points of transmission of force between said differential and said shafts being arranged at equal distances from the axis of said pedestal.

5. In a searchlight including a base, a pedestal mounted on said base for rotation about a vertical axis in a horizontal plane, a searchlight casing mounted on said pedestal for rotation in a vertical plane, the combination of a differential mechanism mounted on said pedestal and arranged to drive said casing, a drive shaft mounted on said base, and means connected between said drive shaft and said differential arranged to transmit the force of said drive shaft to said differential mechanism in two opposite and equal components, the points of transmission of said components being at equal distances from the axis of rotation of said pedestal.

6. In a searchlight including a stationary base, a pedestal mounted thereon and arranged to rotate about a vertical axis and a searchlight drum mounted for rotation about a horizontal axis on said pedestal, means for moving said searchlight casing relatively to said pedestal including a drive shaft mounted in said base, a pair of concentric shafts mounted coaxially with said pedestal and connected to said drive shaft for rotation in opposite directions at equal speeds, a differential mechanism mounted on said pedestal comprising a planetary gear connected to drive said searchlight drum, a second planetary gear connected to one of said concentric shafts, pinions connecting said planetary gears, and a spider for supporting said pinions connected to said second concentric shaft for rotation at one-half the speed that said planetary gear rotates, the points of pressure applied by the gears of said concentric shafts to said gears of said differential being vertically in line with each other.

HENRY G. FRENCH.